March 11, 1924.

H. A. BENNETT

LEVER

Filed March 28, 1922

1,486,721

HENRY A. BENNETT
INVENTOR

BY *Victor J. Evans*
ATTORNEY

WITNESS

Patented Mar. 11, 1924.

1,486,721

UNITED STATES PATENT OFFICE.

HENRY A. BENNETT, OF AURORA, ILLINOIS.

LEVER.

Application filed March 28, 1922. Serial No. 547,435.

*To all whom it may concern:*

Be it known that I, HENRY A. BENNETT, a citizen of the United States, residing at Aurora, in the county of Kane and State of Illinois, have invented new and useful Improvements in Levers, of which the following is a specification.

This invention relates to lever constructions which are principally designed for use in applying brakes on various types of street railway, passenger or freight cars, and an object of the invention is to provide a reversible lever structure as specified which embodies, in combination with a movable lever, a double pawl mechanism movable for engagement with an internal ratchet for holding the lever in adjusted positions and consequently holding a brake in adjusted either applied or unapplied positions.

Other objects of the invention will appear in the following detailed description taken in connection with the accompanying drawings wherein.

Figure 1:
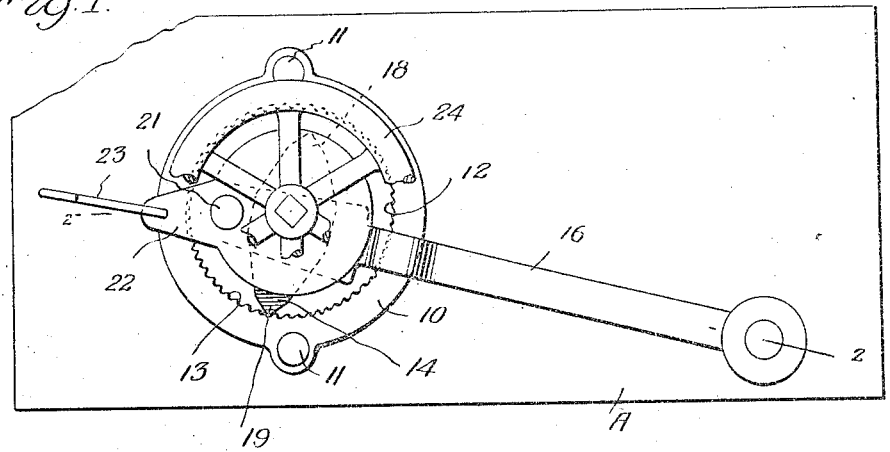
Fig. 1 is a top plan of the improved lever mechanism.
Figure 2:
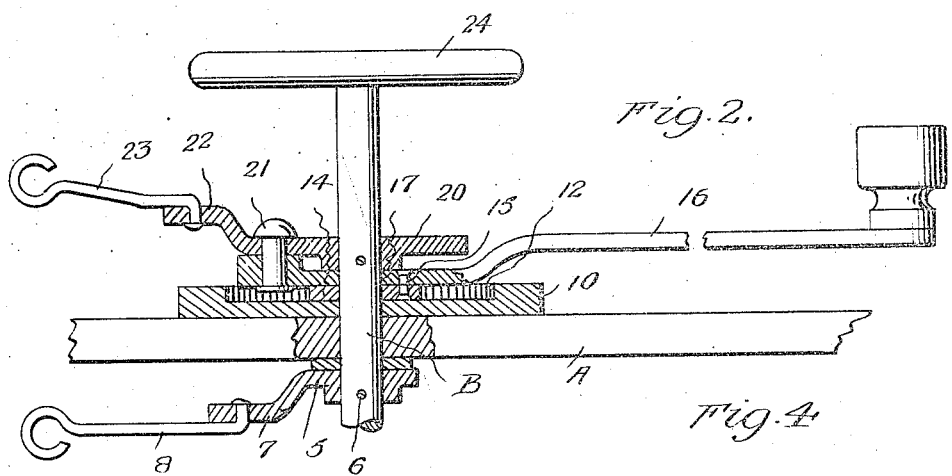
Fig. 2 is a vertical section taken on the line 2—2 of Fig. 1.
Figure 3:
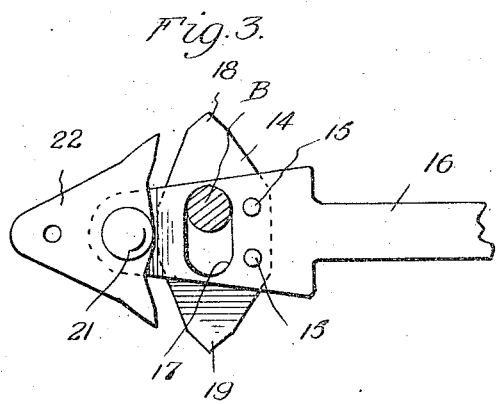
Fig. 3 is a fragmentary horizontal section through the lever structure.
Figure 4:
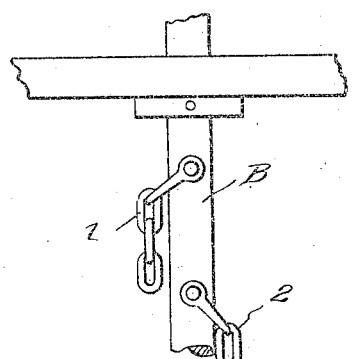
Fig. 4 is a fragmentary elevation of a part of the lever structure.

Referring more particularly to the drawings, the improved lever structure is shown as applied to a suitable support A and it is combined with a brake rod or shaft B which may be connected to brake chains as shown in Fig. 4 of the drawings, for applying the brakes, or may be connected to any suitable analogous mechanism without departing from the spirit of this invention. The illustration in Fig. 4 shows approved type of brake chains 1 and 2 attached to the rod or shaft B in such manner that as one is wound thereon the other one may be unwound therefrom as is ordinary in the construction of applying brakes; however, in the preferred construction of the lever structure as shown in Figs. 1 to 3 of the drawings, a connecting member 5 is provided, which is pinned to the shaft or rod B by a transverse pin 6. The connector 5 is provided with a tab 7 to which a link 8 is pivotally connected. The link 8 is adapted for connection with any suitable mechanism such as a brake chain cable or the like depending upon the use to which the lever structure is to be put. A plate 10 is carried by the support A, and is attached thereto in any suitable manner such as by the screws indicated at 11. The plate 10 has its upper surfaces recessed as shown at 12 and the inner wall of the said recess is serrated or provided with ratchet teeth 13, the points of which are preferably rounded off, and which are doubled or in other words the sides of which extend at equal angles from the altitude of the respective teeth and the said teeth are adapted for cooperation with the double pawl 14.

The pawl 14 is connected by means of rivets 15 to the lever 16 and it is provided with a slot which registers with the slot 17 in the lever 16 and through which slots the rod B extends as clearly shown in Fig. 3 of the drawings, so as to permit limited pivotal movement of the lever 16 to move either of the points 18 or 19 of the pawl 14 into cooperating engagement with the ratchet teeth 13 to permit controlled rotation of the shaft or rod B in either direction. A connector plate 20 is connected to the lever 16 as shown at 21 and it has a tip or tab 22 formed thereon to which a link 23 is connected, the said link being adapted for connection with a brake chain operating cable or analogous structure. In the operation of the device movement downwardly of the handle 16 shown in Fig. 1 will move the pawl 19 into engagement with the teeth 13 and owing to the shape of the teeth 13 the point 15 will have cam action therewith for swinging the tab 22 upwardly. Any tendency of the link 23 to move the tab 22 downwardly will jam the point 19 into engagement with the teeth thereby locking the parts. In other words the point 19 acts as a fulcrum point for exerting pressure against the pin 21 for moving the parts. In the winding of the chain upon the shaft it is, of course, to be understood that the links 8 and 23 will wrap around the shaft B.

In Fig. 2 of the drawings a hand wheel 24 is shown mounted upon the rod B and it is to be understood that this hand wheel may be employed if desired without departing from the spirit of this invention.

It is, of course, to be understood that the invention may be constructed in other manners and the parts associated in other relations and, therefore, I do not desire to be limited in any manner except as set forth in the claims hereunto appended.

Having thus described my invention what I claim is:

1. In a device as set forth, an operating rod, a lever, a pawl carried by said lever, said pawl and lever provided with registering slots receiving therethrough said rod, said pawl provided with opposed operating tips, and a double toothed internal ratchet cooperating with said pawl.

2. In a device as set forth, an operating rod, a lever, a pawl carried by said lever, said pawl and lever provided with registering slots receiving therethrough said rod, said pawl provided with opposed operating tips, a double toothed internal ratchet cooperating with said pawl, connecting members connected to said rod upon opposite sides of said pawl, and links pivotally connected to said connector members.

3. In a device as set forth, a lever, a pawl attached thereto, said pawl and lever provided with registering slots, an operating rod extending through said slots, said pawl and lever movable relative to the rod within the limits of said slots and adapted to rotate the rod upon further movement of the lever, an internal double toothed ratchet mounted about said rod, said lever movable to move said pawl into cooperation with said ratchet at opposite sides of the rod.

4. In a device as set forth, a lever, a pawl attached thereto, said pawl and lever provided with registering slots, an operating rod extending through said slots, said pawl and lever movable relative to the rod within the limits of said slots and adapted to rotate the rod upon further movement of the lever, an internal double toothed ratchet mounted about said rod, said lever movable to move said pawl into cooperation with said ratchet at opposite sides of the rod, and connecting members attached to said rod upon opposite sides of said pawl and rod, and links pivotally connected to said connecting members.

In testimony whereof I affix my signature.

HENRY A. BENNETT.